United States Patent [19]

Goodman

[11] Patent Number: 4,553,419

[45] Date of Patent: Nov. 19, 1985

[54] PROCESS FOR FORMING CELL CANS HAVING INTERNAL LONGITUDINAL RIBS

[75] Inventor: John T. Goodman, Croton-on-Hudson, N.Y.

[73] Assignee: Duracell Inc., Bethel, Conn.

[21] Appl. No.: 363,172

[22] Filed: Mar. 29, 1982

[51] Int. Cl.⁴ ............................................. B21D 22/00
[52] U.S. Cl. .................................................... 72/349
[58] Field of Search ................................ 72/374–349, 72/356, 283

[56] References Cited

U.S. PATENT DOCUMENTS

| | | | |
|---|---|---|---|
| 2,262,734 | 11/1941 | Hileman | 29/623.1 |
| 3,489,868 | 11/1974 | Jost | 72/347 |
| 3,608,350 | 9/1971 | Yamaguchi | 72/358 |
| 3,859,942 | 1/1975 | Moller | 72/348 |
| 3,951,296 | 4/1976 | Swanson | 72/349 |
| 4,175,416 | 11/1979 | Fukushima | 72/283 |
| 4,216,575 | 8/1980 | Carnavos | 72/283 |
| 4,217,771 | 8/1980 | Braun | 72/358 |
| 4,238,949 | 12/1980 | Roper | 72/358 |

Primary Examiner—Leon Gilden
Attorney, Agent, or Firm—Ronald S. Cornell; Israel Nissenbaum

[57] ABSTRACT

The present invention provides a novel process for forming a cell can or container, for a cylindrical battery having longitudinally extending internally projecting ribs which are formed along the internal surface of the battery cell. These ribs provide increased physical and electrical contact between the cell and the electrode material disposed therein. Also disclosed herein is the product formed by this process.

9 Claims, 4 Drawing Figures

PROCESS FOR FORMING CELL CANS HAVING INTERNAL LONGITUDINAL RIBS

BACKGROUND OF THE INVENTION

1. Field of the Invention

The present invention generally relates to a process for forming battery cell containers and, more particularly, pertains to a process for forming cell containers having longitudinal ribs formed therein to improve the electrical and physical contact between the inner wall of the cell container and the electrochemical materials disposed therein.

The present inventive concept provides a novel single step process for forming a metal cell container having longitudinal, internally projecting ribs which provide increased contact area between cell container and the electrochemical material, normally a cathode, disposed therein.

2. Description of the Prior Art

Various fabrication procedures have been employed heretofore for the production of cans of the general type commonly used for beverages and food products. Some of these techniques have been used in the making of containers utilized in cylindrical alkaline batteries, yet none of the prior art methods of forming battery cans forms a cell having longitudinal ribs internally extending and integrally formed simultaneously with the formation of the can body.

One prior art method of producing a one-piece aluminum can body for beverages is to use progressive drawing dies to produce an aluminum body of somewhat less than the desired axial dimension and then to place the body on a mandrel for the purpose of ironing the cylindrical wall of the body by means of a hard metal or carbide ring to thin the metal and to elongate the cylindrical wall to the desired axial dimension. An improvement over this type of processing is disclosed in Fraze, U.S. Pat. No. 3,572,271, which discloses a process for fabricating can bodies having an integral bottom wall. Instead of simply ironing the can while on the mandrel, U.S. Pat. No. 3,572,271 employs a spinning operation which utilizes instead of ironing rings, a rolling means, such as a steel ball, which helically spins around the circumference of the metal while on the mandrel to not only thin the walls of the container but to also cold work the metal to actually heal defects within the metal such as cracks.

Another process for forming cans, and in particular, battery containers, includes taking a metal blank and forming it into a cup-like shape, placing the configuration onto a punch and forcing the metal through a series of ironing rings, each successive ring having an inner diameter smaller than the previous one. In this manner, a container can be produced having an integrally formed bottom wall, and a relatively thin side wall.

Yet another prior art method of producing a one-piece aluminum can body employs impact extrusion to produce an intermediate cup-shaped workpiece. It is not practical to extrude such a workpiece in a single impact stroke because it would be too severe on the dies involved and because slight defects in the metal and the presence of minute bodies of lubricant would result in too many rejects. Therefore, repeated extrusion is employed. The product of the repeated extrusion is placed on a mandrel and is finished to the desired final dimension by using a hard metal ring for a simple ironing operation.

The above-mentioned processes, however, do not teach any solution to the particular problem to which the present invention is directed.

To solve the problem of providing internal ribs, a well known process has previously been employed. Particularly, a two-step formation and drawing process has been employed to form the internally projecting ribs. Typically, after the can has been formed by any of the above-mentioned techniques, the ribs are then drawn onto the can in a secondary operation which can be, for example, by hydroforming or magnaforming.

The present inventive process, however is designed to circumvent the necessity of this or any other secondary operation, thereby inherently decreasing the cost of each item produced. None of the prior art of which Roper, U.S. Pat. No. 4,238,949, Yamaguchi, U.S. Pat. No. 3,608,350, and Connery, U.S. Pat. No. 1,534,299 are typical, even remotely suggests the simple and effective method of the present invention.

Roper, U.S. Pat. No. 4,238,949, discloses a method and apparatus for making metal outers and inners which are typically used in automobile suspension systems. This reference discloses a process for forming a metal annular member having precise tolerances and desired surface finishes. This reference utilizes novel extrusion techniques but does not disclose any process for making longitudinal ribs during the member formation process.

Yamaguchi, U.S. Pat. No. 3,608,350, discloses a method and apparatus for producing commutators for miniature electric machines such as dynamos, starters, and the like, normally for use in automobiles. This reference discloses placing a metal blank into a die having a number of grooves therein, the blank subsequently being pressed by means of extrusion by a punch provided with projecting teeth which correspond to the grooves of the die so as to provide the commutator shape desired. This reference, therefore, discloses a method for making externally projecting teeth on a metal commutator and does not relate to internally projecting ribs.

Connery, U.S. Pat. No. 1,534,299, discloses a corrugation forming die for metal plates having a punch which is fluted so as to construct the walls of the metal corrugation with flutes or other shapes. This reference discloses a punch, used to extrude a piece of metal with a compatible similarly shaped die. This reference is provided to give an overall view of the container art, yet it is not considered to be in a field at all analogous to the present invention.

Consequently, none of the known prior art is particularly directed to a single-step forming operation for providing battery cell containers having internally projecting ribs.

SUMMARY OF THE INVENTION

Accordingly, it is a primary object of the present invention to provide a battery cell container having improved contact between the inner surface of the container and the electrode material, for example, the cathode positioned therein.

Another object of the present invention is to provide a battery cell container having longitudinally, internally projecting ribs which, by a minor interference fit, increase the electrical contact between the metal container and the cathode material therein.

Still, another object of the present invention is to provide an alkaline-manganese battery cell with improved electrical conduction between cathode and battery cell container.

Yet, still another object of the present invention is to provide a battery cell with internal longitudinal ribs in a single-step forming operation thereby decreasing the cost of each container, and battery, so produced.

The present invention provides a completely novel single-step process for forming a battery cell container having longitudinal ribs on the internal surface thereof by providing a punch having a modified circumference upon which the metal blank (in a cup-like configuration) is placed. By forcing the metal through a series of ironing rings, the metal, in addition to ironing the wall of the container to the desired wall thickness, also deforms and flows into the circumferential modifications on the exterior of the punch thereby producing longitudinal ribs in a single-step.

BRIEF DESCRIPTION OF THE DRAWINGS

The foregoing and other objects, advantages and characterizing features of the inventive process of the present invention will become clearly apparent from the ensuing detailed description of an illustrative embodiment thereof, taken together with the accompanying drawings wherein like reference numerals denote like parts throughout the views and in which.

DESCRIPTION OF THE PREFERRED EMBODIMENTS

Figure 1:
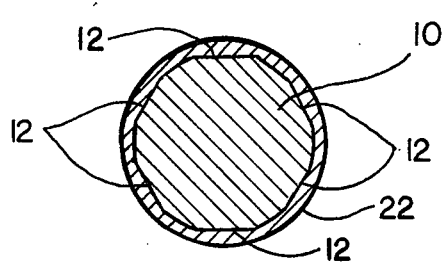
FIG. 1 is an end cross-sectional view of a punch within a cell can formed according to the teachings of the present invention, said punch having longitudinally extending flat portions thereon.

Referring now in detail to the drawings, FIG. 1 discloses an ironing punch 10 shown within cell can 22 formed according to the teachings of the present invention. The punch 10 is generally circular in cross-section with flat portions 12 formed thereon. These flat portions 12 extend longitudinally along the length of the punch at least as long as the total depth of the cell can which is to be ultimately formed. In a preferred embodiment, six such flat portions 12 or areas are equally spaced about the circumference of the ironing punch. In making alkaline-manganese battery cells by the present invention, the ironing punch typically has a diameter of about 3.2 cm. The flats of the present invention are then preferably 0.3 cm in width. However, a wide range of dimensions is contemplated to be within the scope of the present invention.

Figure 2:
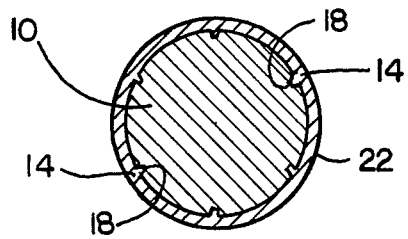
FIG. 2 is a side cross-sectional view of a punch within a cell can formed according to the teachings of the present invention, said punch having longitudinally extending grooves formed thereon.

In FIG. 2, there is shown an alternative embodiment of the present invention. The ironing punch 10, shown within cell can 22, is provided with small grooves 18 which longitudinally extend along the length of the punch 10. In a punch having a diameter of about 3.2 cm, the grooves are contemplated to have a depth of about 3.5 mils, although variation of these dimensions is considered to be within the scope of the present invention. A particular additional feature of this embodiment is that upon the ironing of the metal blank 16, the can subsequently formed has longitudinal ribs 14 corresponding to the grooves 18 of the punch. However, the outer wall 20 of the can 22 is completely round with no indentation corresponding to the ribs 14.

Figure 3:
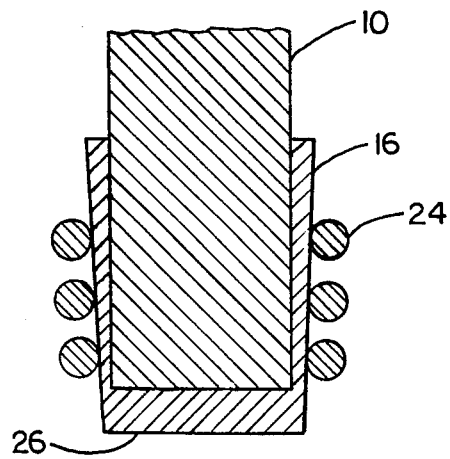
FIG. 3 is a side view in cross-section and with portions broken away, of the ironing punch having a metal blank positioned thereon and forcing the metal blank through a series of ironing rings.
Figure 4:
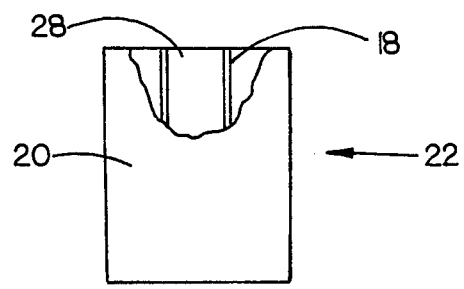
FIG. 4 is a side view of a can, with portions broken away, formed by the process of the present invention.

FIG. 3 shows the process of the present invention wherein the ironing punch 10 irons a metal blank 16 into a cell can 22. In operation, the punch 10 is downwardly driven (by means not shown) with a metal blank 16 having a cup-like configuration, the formation of which is considered to be outside the scope of the present invention, yet is well-known in the art and, consequently, not disclosed herein. The punch drives the metal 16 through a series of ironing rings 24 which are normally comprised of hard material such as carbide and which effectively "iron" the metal in such a manner as to thin the metal blank 16 so as to deform it to the shape of the exterior of the ironing punch 10. The succesive ironing rings 24 have an internal diameter progressively smaller so as to progressively thin the walls of the can to the desired thickness. The bottom 26 of the can remains substantially the same thickness as when in the cup-shaped configuration because localized ironing is not applied.

Upon such ironing, the metal is caused to flow onto such flat portions 12 or into the grooves 18, thereby providing relatively small longitudinal ribs 14 which are adequate to increase the electrochemical and physical contact between inner can surface 28 and the cathode material disposed therein. This increased area provides more consistent performance due to improved conductivity between the can 22 and the cathode thereby providing improved electrical characteristics.

From the foregoing, it is apparent that the objects of the present invention have been fully accomplished. As a result of the present invention, a novel process for the forming of cans having longitudinal ribs has been provided. Although a preferred embodiment of the principles of this invention has been described and illustrated in detail herein, it should be realized that the same is not limited to the particular configuration shown in the drawings, and that modifications thereof are contemplated and can be made without departing from the broad spirit and scope of the invention as defined in the appended claims.

What is claimed is:

1. An improved process for forming an electrochemical cell having a cylindrical cell container whereby upon construction of the cell the contact between the cell container and an electrode material contained therein is enhanced, said cylindrical cell container being formed by an ironing punch upon which a metal blank container having a cup-like configuration is positioned, said ironing punch forcing said metal blank through a series of ironing rings, each successive ring having a smaller inner diameter than the previous ring, said rings successively deforming the metal container so as to progressively thin the walls of the container, said improvement comprising, as part of said deformation step, simultaneously forming a wall having a non-cylindrical inner surface, and a substantially cylindrical exterior surface, and thereafter disposing an electrode into contact with said non-cylindrical inner surface, with said non-cylindrical inner surface having at least one internally extending portion, whereby the contact of said container wall with said electrode material is enhanced.

2. A process as defined in claim 1, said internally extending portion of said can wall comprising integrally formed longitudinal projections along the length of said can which extend radially inwards from the internal surface of said metal can so as to contact the electrode material disposed therein.

3. A process as defined in claim 2, said integrally formed longitudinal projections conforming to the exterior configuration of said ironing punch whereby the deformed metal will, upon ironing, form said integrally extending projections.

4. A process as defined in claim 3, said exterior configuration of said ironing punch comprises at least one flat portion on the circumference of said punch, said flat portion longitudinally extending along the punch a distance equal to less than the total length of said metal can.

5. A process as defined in claim 4, said flat portions being positioned substantially equidistant around the circumference of said ironing punch.

6. A process as defined in claims 4 or 5, said ironing punch having six flat portions formed thereon.

7. A process as defined in claim 3, said exterior configuration of said ironing punch comprising at least one longitudinal groove on the circumference of said punch.

8. A process as defined in claim 7, wherein said grooves are positioned substantially equidistant around the circumference of said ironing punch.

9. A process as defined in claim 8, said ironing punch having six grooves formed thereon.

* * * * *